Dec. 10, 1940.  W. A. VAN BERKEL  2,224,557
SLICING MACHINE
Filed Jan. 3, 1938
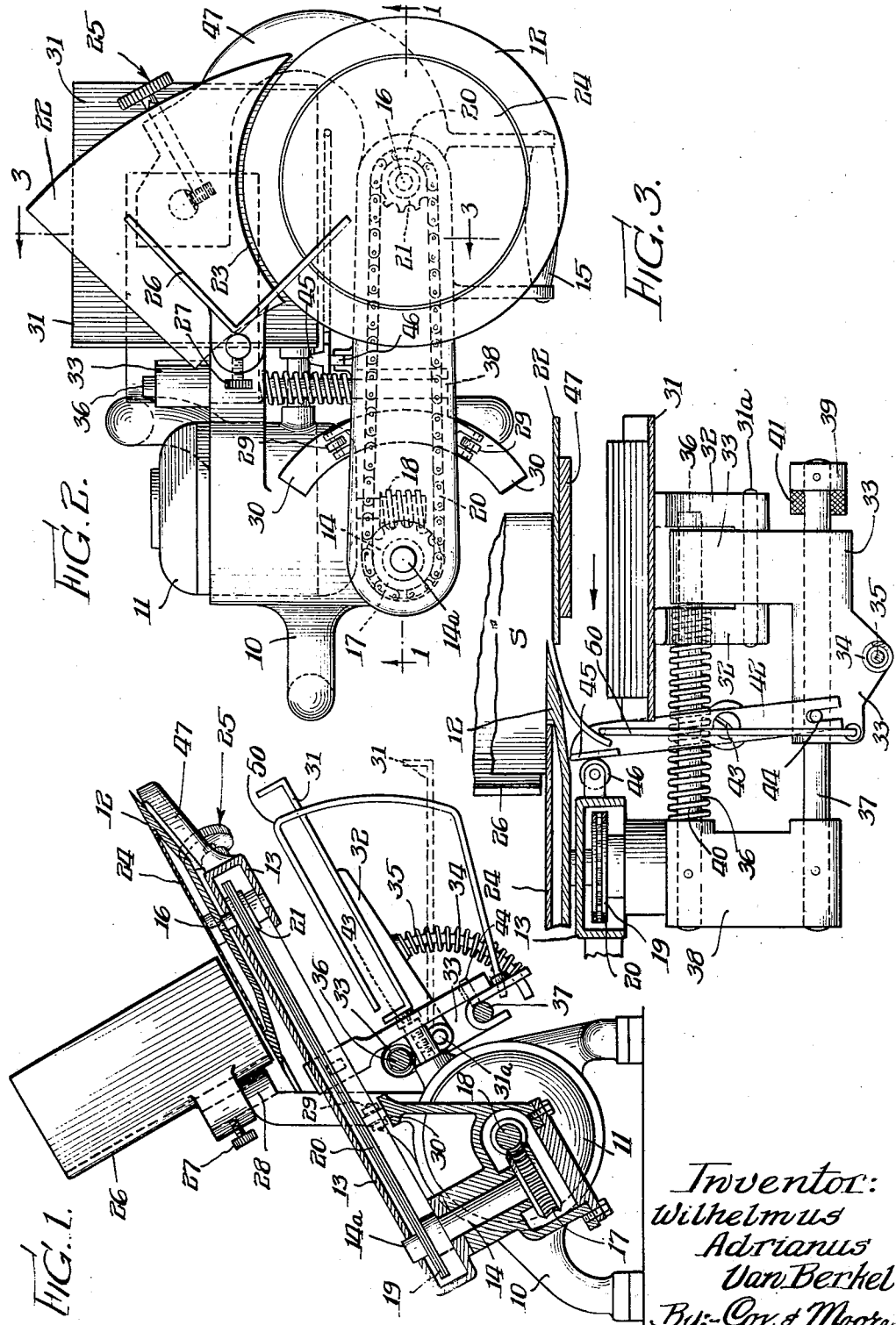
Inventor:
Wilhelmus
Adrianus
Van Berkel
By:- Cox & Moore
attys Patented Dec. 10, 1940

2,224,557

UNITED STATES PATENT OFFICE 2,224,557

SLICING MACHINE

Wilhelmus Adrianus van Berkel, Clarens, Montreux, Switzerland, assignor to U. S. Slicing Machine Company, La Porte, Ind., a corporation of Indiana Application January 3, 1938, Serial No. 183,171
In Great Britain January 14, 1937

8 Claims. (Cl. 146—103)

This invention relates to slicing machines, and more particularly to machines for slicing edible substances, such as meat, bread, vegetables, and the like. More particularly, the invention relates to a slicing machine in which slices are cut from a substance and the cut slices stacked on a substance-receiving tray or platform.

An important object of the invention is the provision of a slicing machine whereby the substance to be sliced is maintained in a relative stationary position, the slices being cut from the substance by a rotary knfe which is manually swung to and from cutting position, there being new and improved means for receiving the slices as they are cut, the slice-receiving tray or table being movable during the slicing operation so as to prevent the slices from becoming wrinkled and cause the slices to be laid smoothly one upon the other.

A further object of the invention is the provision of a slice-receiving trap or table which is movable vertically by the weight of the slices falling thereupon and which is provided with a longitudinal movement so that the trailing portion of the slice being cut will be slightly pulled somewhat and therefore pile with greater neatness upon the table and the previously cut slices.

A still further object of the invention is the provision of a new and improved slicing machine whereby a rotary knife is mounted on a swinging arm, there being a gauge plate also movable with the arm rigidly connected thereto.

Still another object of the invention is the provision of a slicing machine whereby the material or substance to be sliced is fed downwardly perpendicularly to the cutting action of the knife, but slightly inclined from the vertical, the knife also being inclined from the horizontal whereby slices may be cut from the under edge of the substance by manually swinging a rotary knife about an axis to bring the knife into cutting relationship with the substance.

Numerous other objects and advantages will be apparent throughout the progress of the following specification.

The accompanying drawing illustrates a selected embodiment of the invention and the views therein are as follows:

Fig. 1 is a detail longitudinal section of the improved slicing machine and embodying the invention, the view being taken on the line 1—1 of Fig. 2;

Fig. 2 is a detail top plan view of the improved slicing machine; and

Fig. 3 is a detail sectional view on the line 3—3 of Fig. 2.

The invention comprises in general a slicing machine having a substance holder or chute which is so inclined that the substance is fed downwardly by gravity. A swinging carrier, movable to and fro past the inclined holder and carrying a rotary knife arranged at an inclination, cuts slices from the vertically positioned substance. A slice-thickness gauge or gauge plate is connected with the swinging carrier, and a substance abutting guard swings with the swinging carrier. The guard is arranged to mask the body of the knife but permits the cutting edge of the knife to remain exposed.

A slice-receiver is movable so as to accommodate a progressively increasing pile of slices. The slice-receiver is movable so as to cause the slices to be neatly and flatly stacked. The slice-receiver is movable periodically away from the slicing zone during the cutting operation so as to slightly pull the slice, thereby causing the slice to be free of wrinkles and to become neatly piled.

The particular slicing machine herein shown for the purpose of describing the invention comprises a stationary base 10 which houses an electric motor 11 for rotating a circular cutting knife 12. The knife 12 is pivotally mounted for rotation on a swinging arm 13 which is pivoted on a stub axle 14a which forms a part of the shaft 14 journaled in the base 10. The arm 13 is provided with a push-pull hand grip 15. The knife supporting arm 13 is arranged at an upward inclination and carries the knife shaft 16 which comprises a hollow sleeve journaled at the upper end of the arm.

A worm gear 17 is driven by a worm 18 on the shaft of the motor 11. This worm gear 17 rotates the shaft 14. The shaft 14 has a sprocket 19 operatively connected therewith and drives a sprocket chain 20, which sprocket chain drives a sprocket 21 for driving the knife 12.

The arm 13 also carries an adjustable slice-thickness gauge plate 22, and this gauge plate 22 has one edge curved as indicated at 23 to accommodate the curvature of the circular knife edge. A rigidly fixed substance abutting guard plate 24 masks the knife body and is movable with the arm 13. Mechanism indicated generally by the numeral 25 is provided for adjusting the plate 22 to and from the slicing plane. This adjustable mechanism is conventional to various forms of slicing apparatus and therefore will not be further described. The arrangement and construction of the parts is such that when the gauge plate and knife moves across the substance the gauge plate will support the substance and the exposed edge of the knife will cut a slice from the bottom of the substance.

The substance to be sliced is held in a gravity feed trough 26 which is approximately V-shaped, being adjustably secured at 27 to a pillar 28 mounted on the base. The trough 26 is set perpendicular or nearly perpendicular to the slicing plane of the knife, as clearly shown in Fig. 1.

The swinging arm 13 is provided with side rollers 29 which are supported on an arcuate track 30. Therefore, the weight of the swinging knife arm and the parts carried thereby is supported on the stationary arcuate track 30.

Slices which are cut by the knife 12 are adapted to be received by a slice-receiver plate or tray 31 which may consist of any suitable type of tray or flanged plate, and it is located immediately below the slicing zone on the base. This slice-receiver 31 is carried by arms 32 (Fig. 1) which are pivotally mounted at 31a to a movable support 33, the arms 32 being supported by a spring 34 coiled about an arcuate guide rod 35. The construction and arrangement of the parts is such that the weight of the slices, as they are cut from the substance and fall upon the substance receiver 31, tends to press down the receiver and to contract the supporting spring 34. Thus, as the slices continue to fall upon the receiving tray 31, each added slice will depress the tray 31 a short distance, thereby providing accommodation for further slices without in any way interrupting the operation of the machine.

The movable support 33 of the slice receiver 31 is slidably mounted on two horizontal guide rods 36 and 37 which are secured to brackets 38 and 39 on the base. A spring 40 is coiled around the guide rod 36 and continually urges the support 33 in the direction of the knife's slicing stroke and towards a stationary pad or buffer 41 which constitutes a limit stop or bumper. A lever 42 is fulcrumed between its ends at 43 to a part of the motor casing and has a pin and slot connection 44 at its bottom end with the support 33. The upper end of the lever 42 has a plate 45 which is adapted to cooperate and be moved by a roller 46 which is operatively connected to and carried by the swinging arm 13. The roller 46 strikes the plate 45 of the lever 42 towards the end of each slicing stroke and forces the support 33 and the receiver 31 therein suddenly to move in the opposite direction against the action of the spring 40. The construction and arrangement of the parts is such that the receiver 31 will commence its longitudinal movement just before a slice is cut off the substance. Thus, the trailing portion of the slice will be slightly pulled somewhat taut, causing the slice to fall with greater neatness than it would if it were allowed to simply drop or topple onto the stationary receiver. The receiver 31, at the end of the cutting stroke, returns to its initial position because of the urging action of the return spring 40.

During the cutting operation of the knife, that is, while the knife is moved on its pivot 14a to cut a slice from the substance in the trough 26, as shown in Fig. 3, the slice will be cut from the substance S and extend between the edge of the knife and the edge of the gauge plate 22. Swinging movement of the arm 13 to continue the cutting of the slice from the substance, brings the roller 46 into engagement with the striking surface 45 of the arm 42 and causes the slice-receiving tray 31 to move in the direction of the arrow, so that when the slice being cut reaches the surface of the other slices on the receiving tray there will be a drag on the slice and the slice will be held frictionally somewhat taut so that there will be no wrinkles in the cut slice. During the progress of the slicing operation, with the knife 12 traveling toward the right, Fig. 3, the slice being cut from the substance will come into contact with the slice supporting element 50. Just before the slice is entirely severed the element 50 on the bracket 33 is moved with the bracket to the left by the roller 46 forcing against the plate 45 on the lever 42. The slice, therefore, is caused to be pulled over the member 50 and stretched out and to become positioned neatly on the tray or on top of the other stacked slices. Without the supporting element or bar 50 the edge of the newly cut slice, shown supported in Fig. 3, would rest on the last cut slice or the edge of the stack, and the slice would have a tendency to stick to the slices on the stack and in all probability become disarranged. The receiving tray or plate 31 will continue movement to the left (Fig. 3) until the slice is completely severed, at which time it will be flat and neatly stacked upon the already stacked slices. When the swinging arm 13 is moved away from cutting position the slice-receiving tray will be returned back to its normal position by the action of the spring 40.

The gauge plate 22 may be supported in any particular manner desired just so that there will be no obstruction between the top of the slice-receiving tray 31 and the bottom edge of the cutting knife and gauge plate. There is a rigid connection between the arm 13 and the gauge plate 22, which connection may comprise a supporting arm or bracket 47.

The invention provides a slicing machine in which the knife is arranged in an inclined position and carried by a swinging arm. The gauge plate is operatively connected to the swinging arm and has vertical movement to provide adjustment so as to cut slices of various thicknesses. The substance is fed by gravity vertically to slicing position, being held by means of a stationary substance support or trough. When the swinging arm is reciprocated about its pivot 14a slices will be sliced from the bottom of the substance S. As the slice is being cut the slice-receiving tray or receiver will be moved so as to create a drag and maintain the slice relatively taut during the slicing operation so that there will be no wrinkles in the slice and the slice will be evenly placed upon the tray. Succeeding slices are operated upon in the same manner, with the result that all slices will be neatly stacked and arranged in a pile.

Instead of showing the knife arranged at the upper point of inclination, the parts, of course, could be reversed so that the knife would be at the lower end of the inclination, but this is merely a matter of choice and such changes are contemplated within the purview of the appended claims.

Changes may be made in the form, construction and arrangement of the parts without departing from the spirit of the invention or sacrificing any of its advantages, and the right is hereby reserved to make all such changes as fairly fall within the scope of the following claims.

The invention is hereby claimed as follows:

1. A slicing machine comprising a swingable inclined knife supporting bracket, a knife revolubly mounted on said bracket, means for actuating the knife, a gauge plate carried by said bracket, a substance support for supporting substance in a plane substantially perpendicular to the plane of the knife and gauge plate, a substance receiving tray arranged beneath the knife to receive slices as they are cut from said knife, and means controlled by the movement of the bracket to move the substance supporting tray in a direction opposite to the movement of the bracket.

2. A slicing machine comprising a base, a knife, means supporting the knife and means for actuating the knife, a feeder, there being relative movement between the knife and feeder, and a receiving tray to receive slices cut by the knife from the substance, means movably mounting the tray, means controlled by the knife support at the beginning of the cutting operation and for moving the substance tray in a direction toward that part of the substance first engaged by the knife so that the slice prior to being severed from the substance will engage the tray and will thereby be frictionally held taut to remove wrinkles therefrom and cause the slice to be neatly arranged on the tray, and spring means supporting said tray whereby the weight of slices on the tray will tend to lower the tray to keep the last slice in approximately the same elevation as the tray prior to the time the slices were received thereon.

3. A slicing machine comprising an inclined swingable arm, a knife and a gauge plate carried by said arm, a slice receiver arranged below the knife and adapted to receive slices successively as they are cut by the knife from the substance, means movably mounting the slice receiver, means controlled by said swinging arm to move the slice receiver in an opposite direction to the movement of the arm and at a speed equal to the speed at which the slice is cut, said last named means moving the slice receiver in a direction away from the cutting edge of the knife whereby the free edge of an unsevered slice will lie on the uppermost surface of the slice receiving tray, the continued movement of the slice receiver tending to stretch the slice as it is being cut and remove wrinkles therefrom and arrange the slice neatly on the slice receiver.

4. A slicing machine comprising an upwardly inclined swingable arm, a knife and a gauge plate carried by said arm, a slice receiver arranged below the knife and adapted to receive slices successively as they are cut by the knife from the substance, means movably mounting the slice receiver, means controlled by said swinging arm to move the slice receiver in an opposite direction to the arm and at a speed equal to the speed at which the slice is cut, said last named means moving the slice receiver in a direction away from the cutting edge of the knife whereby the free edge of an unsevered slice will lie on the uppermost surface of the slice receiving tray, the continued movement of the slice receiver tending to stretch the slice as it is being cut and remove wrinkles therefrom and arrange the slice neatly on the slice receiver, said slice receiver being also pivotally mounted, and spring means under the edge of said slice receiver to hold the slice receiver in a predetermined position and permit said slice receiver to move on its pivot and to press the springs by the weight of the successive slices.

5. A slicing machine comprising a knife inclined from the horizontal, a swingable knife supporting bracket carrying the knife, a gauge plate supported by said knife supporting bracket, a substance support for supporting substance in a plane substantially perpendicular to the plane of the knife, and a slice receiving tray arranged beneath said knife, means movably supporting the slice receiving tray, said tray being movable by the supporting bracket during its swingable movement but in an opposite direction.

6. A slicing machine comprising a knife inclined from the horizontal, a swingable knife supporting bracket carrying the knife, a gauge plate supported by said knife supporting bracket, a substance support for supporting substance in a plane substantially perpendicular to the plane of the knife, a pivotally mounted substance support beneath the knife and upon which slices are received as they are cut, means movably mounting the pivotally mounted substance support, means operably connecting the bracket and the slice receiving support, means operable by the bracket to operate the last named means near the end of a slicing stroke to move the slice receiving support in a direction opposite to the movement of the knife bracket, and spring means for supporting the substance support whereby the support will depress the spring as the slices are received on the support.

7. A slicing machine comprising a knife inclined from the horizontal, a movable knife supporting bracket for carrying the knife, a gauge plate supported by said bracket, a substance support for supporting the substance in a plane relatively perpendicular to the plane of the knife, a slice receiving tray arranged beneath the knife, means movably mounting the tray, and means operably connecting the bracket and tray, said last named means being operable during movement of the knife supporting bracket to move the slice receiving tray in a direction opposite to the movement of the bracket and toward the free edge of the slice as it is first being severed from the substance.

8. A slicing machine comprising an inclined swingable arm, a knife and a gauge plate carried by said arm, a slice receiver arranged below the knife and adapted to receive slices successively as they are cut by the knife from the substance, means movably mounting the slice receiver, a slice support, means controlled by said swinging arm to move the slice support and slice receiver in an opposite direction to the movement of the arm and at a speed synchronized to the speed at which the slice is cut, said last named means moving the slice receiver and slice support in a direction away from the cutting edge of the knife while the slice is being cut whereby the free edge of an unsevered slice will rest on the uppermost surface of the slice support, the continued movement of the slice receiver and support to stretch the slice as it is being cut and remove wrinkles therefrom, the slice being later released from the support and arranged neatly on the slice receiver.

WILHELMUS ADRIANUS VAN BERKEL.